ย
2,769,744

INSECT REPELLENT COMPOSITION AND
METHOD

Eduard Usteri, Basel, Switzerland, assignor to Ciba Limited, Basel, Switzerland, a Swiss firm No Drawing. Application February 5, 1951,
Serial No. 209,515

Claims priority, application Switzerland
February 16, 1950

3 Claims. (Cl. 167—33)

The need to find means for repelling stinging, bloodsucking and other troublesome insects is of considerable importance in many parts of the world, because these insects attack not only human beings and domestic animals but are in many cases carriers of disease such, for example, as *Anopheles quadrimaculatus*. This is generally achieved by applying a repellent substance to the exposed parts of the body. The clothing may also be impregnated with such substances. Such repellent substances have to fulfil special requirements in various respects. In order that it may be applied to the skin it must not be toxic, and above all it must not cause skin irritations such as itching or burning and it must not have a sensitizing action, that is to say no skin irritation should arise even after repeated application. Furthermore such insect repellents should not possess an odor disagreeable to human beings and it should not produce stains on textiles. Further important requirements are a long period of activity and a wide range of activity.

Various products are already on the market which only partially fulfil the requirements of good insect repellents. Most of them are too volatile and therefore have a short period of activity such, for example, as citronella oil, dimethylphthalate, n-butyl-mesityl oxide oxalate and β-ethyl-hexane diol. Other substances have other disadvantages so that the need for insect repellents which sufficiently fulfil allrequirements still exists.

The present invention provides an insect repellent composition which has a content of an ester of the general formula

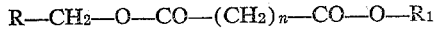

in which $n$ represents 0 or a whole number from 1 to 8, R represents the radical of a 5-membered heterocyclic ring consisting of four carbon atoms and an oxygen atom, and $R_1$ represents an alkyl or cyloalkyl radical. These compounds are therefore asymmetrical diesters of aliphatic dicarboxylic acids.

As dicarboxylic acids there may be used oxalic acid, malonic acid, succinic acid, glutaric acid, adipic acid, pimelic acid, suberic acid, azelaic acid and sebacic acid; especially active insect repellents are the esters of adipic acid.

As alcohols which are used to esterify one of the carboxyl groups of the dicarboxylic acid and which contain a 5-membered heterocyclic ring consisting of four carbon atoms and an oxygen atom, there may be used furfuryl alcohol and especially tetrahydrofurfuryl alcohol.

As alcohols which are used to esterify the second carboxyl group of the dicarboxylic acid there are used aliphatic or cycloaliphatic alcohols such, for example, as methyl alcohol, ethyl alcohol, isopropyl alcohol, n-butyl alcohol, isoamyl alcohol, cyclohexyl alcohol, and also glycol monomethyl ether and the like.

Extensive tests of various types of esters have shown that the asymmetrical esters of the present invention are excellent insect repellents. An especially good activity is exhibited by the asymmetrical diesters of adipic acid, in which one of the ester radicals is the radical of tetrahydrofurfuryl alcohol, such, for example, as adipic acid isopropyl tetrahydrofurfuryl diester.

These diesters are slightly viscous, colorless liquids which are practically odorless or possess a faint and pleasant odor, and they are easily soluble in the usual organic solvents and oils. They are rather sparingly volatile and therefore have a long period of activity. They can be made by known general methods, for example, semi-ester chloride may be reacted with furfuryl alcohol in the presence of pyridine or a dicarboxylic acid monoester may be esterfied in the presence of an acid esterification catalyst, for example, sulfuric acid or toluene sulfonic acid, with tetrahydrofurfuryl alcohol. Furthermore a symmetrical dicarboxylic acid diester may be re-esterfied with a different alcohol, advantageously in the presence of a basic catalyst for example, sodium ethylate or aluminum isopropylate. Finally it is also possible to prepare such substances by esterifying the free dicarboxylic acid with a mixture of the two alcohols.

These diesters, either alone or together with other esters or insect repellents, are usually applied in admixture with, or dissolved or emulsified in carriers. Such carriers may be in liquid or semi-solid or solid form, but advantageously liquid or semi-liquid carriers are used. Among these there may be mentioned liquid organic diluents, for example, organic solvents, such as alcohols, ketones and the like; for example, ethyl alcohol, isopropyl alcohol, glycerine, cyclohexanol, methyl cyclohexanol, trichloroethylene, benzine, and esters of vegetable or animal origin such as vegetable or animal oils or fats such as peanut oil, cocoa butter, lanoline and the like. However, there may also be used mineral oils and fats such, for example, as paraffin oil, white mineral oil, Vaseline, Vaseline oil and the like. When an aqueous emulsion of the insect repellent is desired water serves as the carrier together with an emulsifying agent, and if desired with the addition of one or more of the above mentioned compounds. As solid carriers there come into consideration those of organic and inorganic origin. Among the former may be mentioned, for example, beeswax, paraffin wax and cetyl alcohol; and among the latter kaolin, talc and the like. Obviously, depending on the purpose for which the composition is to be used such mixtures may contain further additions such, for example, as anti-sunburn agents, perfumes and the like. By suitably selecting one or more carriers and the other additions there may be obtained solutions, salves, creams, oils, emulsions or powders.

The following examples illustrate the invention, the parts being by weight unless otherwise stated and the relationship of parts by weight to parts by volume being the same as that of the gram to the cubic centimeter:

*Example 1*

20 part of furfuryl alcohol, 20 parts of pyridine and 50 parts by volume of benzene are mixed together in a stirring vessel fitted with a thermometer, dropping funnel and reflux condenser, and the solution is cooled to 10° C. A solution of 38 parts of succinic acid chloride butyl monoester in 50 parts by volume of benzene are introduced dropwise into the aforesaid solution in such manner that the temperature does not rise above 20° C. Pyridine hydrochloride separates rapidly. When the addition is complete the whole is heated for ½ hour at 80° C. After cooling, the whole is stirred with water in order to dissolve the pyridine hydrochloride. After separating the aqueous layer, the benzene layer is washed twice with dilute hydrochloric acid and then twice with dilute sodium carbonate solution. The benzene layer is then washed with water until the washing water has a neutral reaction. The benzene solution is then dried over anhydrous sodium sulfate and the solvent is distilled off.

The product is then fractionally distilled in vacuo. Succinic acid butyl furfuryl diester is obtained in very good yield in the form of a colorless oil which passes over at 178–182° C. under a pressure of 10 mm.

*Example 2*

46 parts of adipic acid di-isopropyl ester, 20 parts of tetrahydrofurfuryl alcohol and 5 parts of aluminum isopropylate are heated in a distillation vessel for 3–4 hours at 160–170° C. The aluminum isopropylate passes into solution and a total of 12 parts of isopropyl alcohol distills. After cooling, the reaction mass is taken up in a solvent, for example, benzene, and the aluminum isopropylate is dissolved with dilute hydrochloric acid. The mixture is then washed until neutral and the benzene layer is dried. After removing the solvent the product is fractionated under a high vacuum. There are obtained 17 parts of the starting material (adipic acid di-isopropyl ester), 23 parts of adipic acid isopropyl tetrafurfuryl diester boiling at 132–136° C. under a pressure of 0.04 mm. and 14 parts of adipic acid di-tetrahydrofurfuryl ester.

*Example 3*

440 parts of adipic acid, 310 parts of tetrahydrofurfuryl alcohol, 240 parts of ethyl alcohol, 10 parts of toluene sulfonic acid and 400 parts by volume of benzene are boiled for 6–8 hours under reflux in a vessel fitted with a water-separating device, that is to say a device which continuously removes the water formed during the reaction. During this operation 200 parts by volume of a mixture of water and alcohol separate. 5 parts of sodium bicarbonate are added to neutralize the toluene sulfonic acid, the solvent is distilled off under atmospheric pressure and the ester mixture is separated in vacuo. There is obtained a mixture consisting mainly of adipic acid ethyl tetrahydrofurfuryl diester, which passes over at 132–135° C. under 0.04 mm. pressure, and is a colorless, odorless, easily mobile oil, and also contains adipic acid diethyl ester and adipic acid ditetrahydrofurfuryl ester.

*Example 4*

27 parts of adipic acid cyclohexyl monoester, 12 parts of tetrahydrofurfuryl alcohol, 2 parts of toluene sulfonic acid and 150 parts by volume of benzene are heated under reflux in an apparatus fitted with the water separating device described in Example 3. After 4 hours water no longer separates. The resulting solution is extracted with dilute sodium carbonate solution, and then washed neutral with water. After driving off the solvent, the adipic acid cyclohexyl tetrahydrofurfuryl diester is obtained by distillation in a high vacuum in the form of a viscous oil, which passes over at 164–166° C. under 0.08 mm. pressure.

*Example 5*

10 parts of adipic acid isopropyl tetrahydrofurfuryl diester and 1 part of glycerine monostearate are dissolved in 89 parts of ethyl alcohol. There is obtained an insect repellent solution which is excellently suited for rubbing onto exposed parts of the body.

*Example 6*

15 parts of succinic acid butyl furfuryl diester, 44 parts of paraffin oil, 15 parts of white Vaseline, 1 part of cetyl alcohol and 25 parts of paraffin wax are intimately mixed together. The resulting mass is an insect repellent fatty skin cream.

*Example 7*

10 parts of adipic acid cyclohexyl tetrahydrofurfuryl diester and 10 parts of adipic acid isopropyltetrahydrofurfuryl diester and 8 parts of menthyl salicylate are dissolved in 36 parts of peanut oil and 36 parts of paraffin oil. The resulting product is an antisunburn oil having an excellent insect repellent action.

*Example 8*

12 parts of adipic acid ethyl tetrahydrofurfuryl diester, 1 part of benzyl anthranilate, 6 parts of cetyl alcohol, 14 parts of Vaseline oil, 10 parts of white beeswax, 14 parts of lanoline, 3 parts of cocoa butter, 39.7 parts of water and 0.3 part of sodium benzoate are worked up by intimate mixing into an anti-sunburn cream having an excellent insect repellent action.

*Example 9*

4 parts of succinic acid butyl furfuryl diester, 10 parts of glycerine monostearate, 4 parts of cetyl alcohol, 1 part of sodium cetyl sulfonate, 1 part of stearic acid and 5 parts of glycerine are intimately mixed together and emulsified in 75 parts by volume of water. There is obtained an insect repellent emulsion which constitutes a very good non-fatty skin cream.

*Example 10*

30 parts of succinic acid butyl furfuryl diester and 40 parts of white mineral oil, of which the viscosity is 30 centipoises at 20° C., are dissolved in 30 parts of isopropyl alcohol. The resulting solution can be rubbed onto the most troubled parts of domestic animals, for example, horses or cows, whereby an effective insect repellent action is obtained.

*Example 11*

800 parts of adipic acid isopropyl tetrahydrofurfuryl diester, 30 parts of white mineral oil of which the viscosity is 30 centipoises at 20° C., 40 parts of triethanolamine, 80 parts of oleic acid and 30 parts of methyl cyclohexanol are homogeneously mixed together. There is obtained an oil which emulsifies well with water. In order to protect animals, for example, cows against insects, they may be sprayed with a liquor which is prepared, advantageously, by emulsifying 1 part of the oil of this example in 4 parts by volume of water.

Instead of the mineral oil there may be used a concentrate of an insecticide or acaricide.

*Example 12*

In order to render textiles, especially clothes and laundry goods, insect repellent the goods are impregnated either with a solution of an insect repellent in a volatile solvent, such as acetone, alcohol, trichloroethylene or benzine, or immersed in an aqueous emulsion of such a repellent and then dried. A solution of 25 parts of succinic acid cyclohexyl furfuryl diester and 5 parts of 4:4'-dichlorodiphenyltrichloromethyl methane in 70 parts of acetone is very suitable, for example, for impregnating textiles to render them insect repellent and also insecticidal.

An aqueous emulsion, in which clothes may be immersed and which after drying has an insect repellent action, may be prepared as follows: 20 parts of the reaction product of about 15 mols of ethylene oxide with 1 mol of cetyl alcohol are dissolved with gentle warming in 80 parts of adipic acid furfuryl ethyl diester, and the resulting solution is emulsified in 400 parts by volume of water.

What is claimed is:

1. An insect repellent composition comprising essentially as an active constituent an insect-repellently effective proportion of the ester of the formula $$\begin{array}{c} H_2C\text{------}CH_2 \\ | \quad\quad | \\ H_2C \quad CH\text{---}CH_2\text{---}O\text{---}CO\text{---}(CH_2)_4\text{---}CO\text{---}O\text{---}CH \\ \diagdown\diagup \\ O \end{array} \quad\quad \begin{array}{c} CH_3 \\ \diagup \\ \diagdown \\ CH_3 \end{array}$$

and a carrier therefor, which composition is free from cellulose ethers, cellulose esters and aromatic solvents.

2. A process of repelling insects, which comprises applying to the region from which the insects are to be repelled, a repellent composition of matter, which contains as an insect repellent active substance the ester of the formula

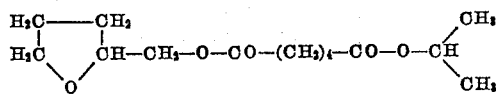

3. A process of repelling insects, which comprises applying to the skin a repellent composition of matter which contains as insect repellent active substance the ester of the formula

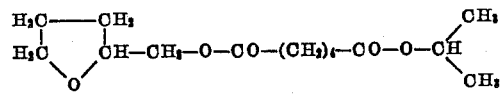

References Cited in the file of this patent

UNITED STATES PATENTS

| | | |
|---|---|---|
| 1,989,701 | Lawson | Feb. 5, 1935 |
| 2,435,005 | Huppke | Jan. 27, 1948 |
| 2,528,544 | Pijoan | Nov. 7, 1950 |

OTHER REFERENCES

OSRD Insect Control Committee Report No. 16, Interim Report No. O-87. Published February 1, 1945, pp. 1, 2, 3, 6, 7, 9, 14, 15, 18, 73, 92, 96 and 109. (Note particularly pp. 15 and 73.)